H. E. DEY.
DRIVING WHEEL FOR AUTOMOBILES AND OTHER VEHICLES.
APPLICATION FILED SEPT. 28, 1918.
1,321,898.
Patented Nov. 18, 1919.
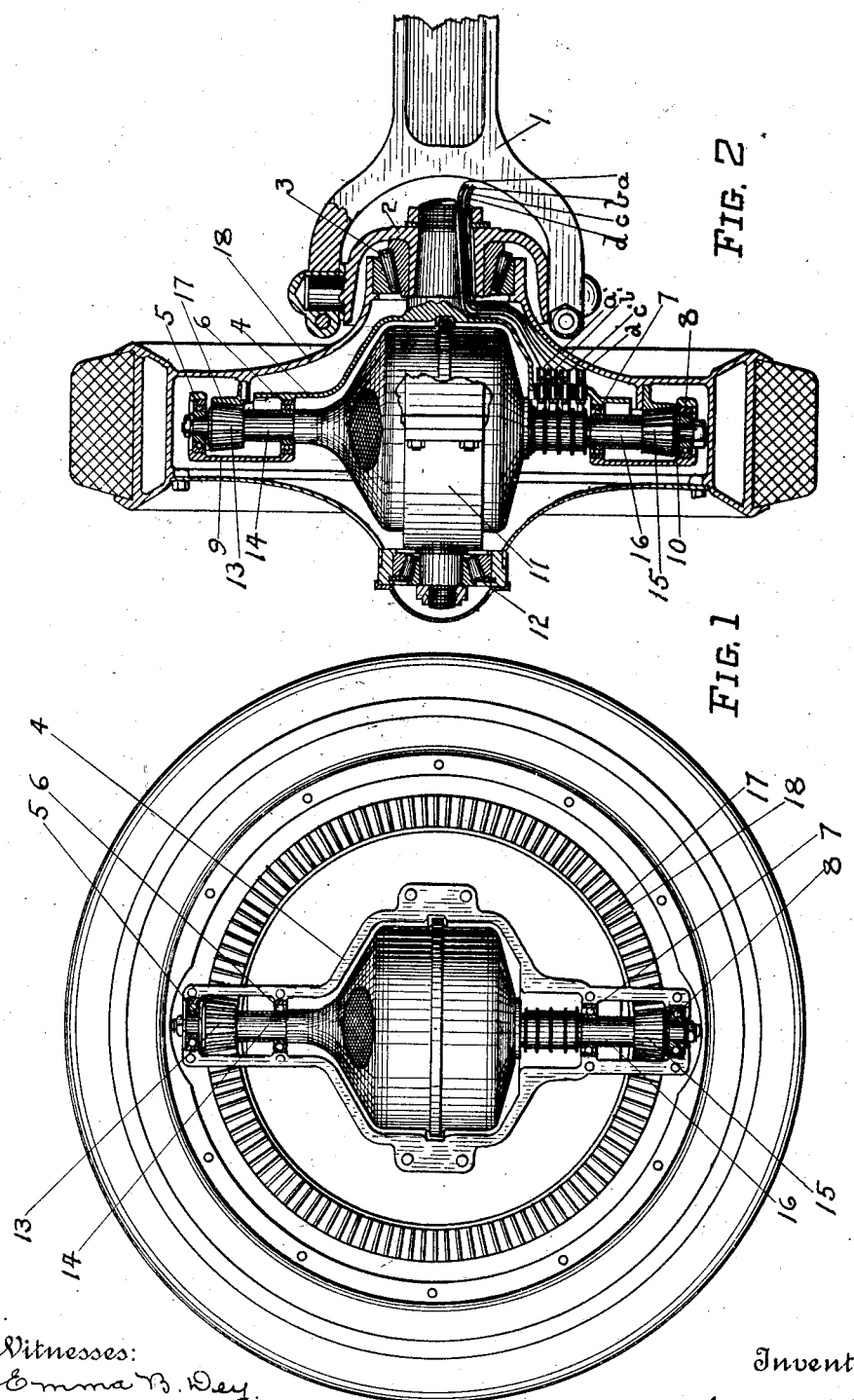

UNITED STATES PATENT OFFICE.

HARRY E. DEY, OF JERSEY CITY, NEW JERSEY.

DRIVING-WHEEL FOR AUTOMOBILES AND OTHER VEHICLES.

1,321,898. Specification of Letters Patent. Patented Nov. 18, 1919.

Application filed September 28, 1918. Serial No. 256,032.

*To all whom it may concern:*

Be it known that I, HARRY EUGENE DEY, a citizen of the United States, and a resident of Jersey City, in the county of Hudson and State of New Jersey, have invented certain new and useful Improvements in Driving-Wheels for Automobiles and other Vehicles, of which the following is a specification.

This invention relates to electrically driven vehicles, and is especially applicable to those in which all wheels are driving wheels, commonly known as four wheel drive. The complete mechanism for moving the car is inclosed inside of the wheels; thus avoiding the objection of transmitting power past the steering knuckles through a jointed shaft.

Referring to the accompanying drawings: Figure 1 is a plan view of the wheel with its cover plate removed, also the caps over the bearings of the motor and the semi-ring which carries the outer bearing of the wheel. The motor is of a special type, similar to that shown in my U. S. Patent #1,158,456, in which the armature and the field magnet are both adapted to rotate. Fig. 2 is a vertical section, partly in elevation, taken diametrically through the wheel. For convenience in illustrating, the axis of the motor is shown in a vertical position; in practice, however, it would be preferable to have the motor axis in a horizontal position.

The axle of the vehicle is represented by 1, Fig. 2; trunnioned in the axle is part 2, serving for what is commonly known as the stub axle. It carries the main wheel bearing 3; and also the framework 4, that serves as the motor support. The motor is supported at each end by means of two sets of ball bearings 5, 6, 7 and 8. Caps 9 and 10 hold the bearings, and hence the motor, in place. The frame 4, is semi-circular in section, and at the middle portion a semi-circular band 11, is bolted. The outer wheel bearing 12, is carried on the band 11; the two being readily removable at any time for removal of the motor. The bevel pinion 13, is keyed upon the armature shaft 14, and the pinion 15, upon the field shaft 16. These pinions mesh with the bevel gear 17, which is mounted upon a circular flange forming part of the wheel 18.

The wires $a$, $b$, $c$ and $d$, coming from the controller, pass through a slot provided in the shaft like extension of the frame 4, and thence to the slip ring brush terminals $a'$, $b'$, $c'$ and $d'$.

The supply of current is provided by any of the well known means; as, for example, a storage battery, or an engine and dynamo combination unit carried upon the vehicle. The control can also be of any of those of present or future practice.

The method of operation consists in supplying current to the motor through the slip rings, connecting wires, etc., as previously mentioned, thus causing the armature and the field magnet of the motor to rotate in opposite directions; and as their pinions 13 and 14, mounted upon the ends of their respective shafts, mesh at diametrically opposite points of the bevel gear 17, their opposing directions act cumulatively to drive the bevel gear, and hence the wheel, in the desired direction.

Motors inclosed in the wheels and transmitting their power by means of bevel gearings are not new, but due to the fact that they have previously been designed with a single rotating element, two of the large gears have been required, for the pinions at the two ends of a single shaft oppose one another if meshed with a gear common to both at diametrically opposite points; consequently two gears have to be provided, facing each other with the pinions between; the space exceeding the diameter of the pinions to enable each pinion to drive its own gear without interfering with the other. My plan, however, of rotating the two elements of the motor, in opposite directions, brings about the proper conditions for driving a single gear from the two pinions; thus saving in the cost and weight besides adding to the accessibility.

In addition to eliminating the cost and weight of one large gear per wheel, there is the added advantage of cutting the size and weight of the motor in two for a given horsepower and speed; owing to the fact that the power of the motor is measured by the combined speed of its two elements, thus making it the equivalent of a motor of twice the speed; which also tends for higher efficiency.

I include all moving vehicles under the classification, automobile.

I claim—

A driving wheel for automobiles, comprising an electric motor having rotatable field and armature elements, shafts connected to said elements; a framework for supporting said motor in a position to permit the axis of the motor shafts to coincide with the diametrical plane of the wheel; a pinion mounted upon each shaft; a main gear attached to, and mounted concentrically to the axis of the wheel and meshing with the pinions at diametrically opposite points.

HARRY E. DEY.

Witnesses:
WILLIAM S. BARRY,
MARY E. BARRY.